US012240144B2

(12) United States Patent
Campbell et al.

(10) Patent No.: US 12,240,144 B2
(45) Date of Patent: Mar. 4, 2025

(54) METHOD FOR CMC AIRFOIL USING CORE TUBE OF RIGIDIZED CERAMIC FABRIC

(71) Applicant: RAYTHEON TECHNOLOGIES CORPORATION, Farmington, CT (US)

(72) Inventors: Christian X. Campbell, West Hartford, CT (US); Robert A. White, III, Meriden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/300,863

(22) Filed: Apr. 14, 2023

(65) Prior Publication Data

US 2024/0342954 A1 Oct. 17, 2024

(51) Int. Cl.

| | |
|---|---|
| ***B28B 21/48*** | (2006.01) |
| ***B28B 21/86*** | (2006.01) |
| ***B28B 21/92*** | (2006.01) |
| ***F01D 5/28*** | (2006.01) |

(52) U.S. Cl.

CPC .............. *B28B 21/48* (2013.01); *B28B 21/86* (2013.01); *B28B 21/925* (2013.01); *F01D 5/282* (2013.01); *F01D 5/284* (2013.01); *F05D 2300/6033* (2013.01)

(58) Field of Classification Search

CPC . F01D 5/28; F01D 5/282; F01D 5/284; F01D 9/041; F01D 9/042; F01D 9/044; F01D 25/005; F05D 2300/6033

See application file for complete search history.

(56) References Cited

U.S. PATENT DOCUMENTS

| | | | | |
|---|---|---|---|---|
| 9,896,945 | B2 * | 2/2018 | de Diego | C04B 35/573 |
| 10,569,481 | B2 | 2/2020 | Gallier et al. | |
| 10,767,502 | B2 * | 9/2020 | Schetzel | F01D 5/282 |
| 11,414,355 | B2 | 8/2022 | Sheedy et al. | |
| 11,434,177 | B2 | 9/2022 | Razzell et al. | |
| 11,519,279 | B2 | 12/2022 | Shinavski et al. | |
| 2019/0211695 | A1 * | 7/2019 | Propheter-Hinckley | F01D 5/186 |
| 2019/0242263 | A1 | 8/2019 | Frey et al. | |
| 2020/0080434 | A1 * | 3/2020 | Thomas | F01D 5/282 |
| 2020/0392049 | A1 * | 12/2020 | Razzell | C04B 41/87 |

FOREIGN PATENT DOCUMENTS

| | | |
|---|---|---|
| EP | 3054096 | 8/2016 |
| EP | 3825517 | 5/2021 |
| EP | 4119772 | 1/2023 |
| EP | 4134357 | 2/2023 |

OTHER PUBLICATIONS

European Search Report for European Patent Application No. 24170221.6 mailed Oct. 15, 2024.

* cited by examiner

*Primary Examiner* — David E Sosnowski
*Assistant Examiner* — Maxime M Adjagbe
(74) *Attorney, Agent, or Firm* — Carlson, Gaskey & Olds, P.C.

(57) ABSTRACT

A method of fabricating an airfoil includes providing an airfoil core tube that is made of a rigidized ceramic fabric, using the airfoil core tube as a mandrel by braiding a plurality of ceramic fiber tows around the airfoil core tube to form one or more braided layers, where the airfoil core tube and the one or more braided layers forming an airfoil preform, and densifying the airfoil preform with a ceramic matrix material to thereby form a ceramic matrix composite airfoil.

9 Claims, 6 Drawing Sheets

METHOD FOR CMC AIRFOIL USING CORE TUBE OF RIGIDIZED CERAMIC FABRIC

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A method for fabricating an airfoil according to an example of the present disclosure includes providing an airfoil core tube that is made of a rigidized ceramic fabric, and using the airfoil core tube as a mandrel by braiding a plurality of ceramic fiber tows around the airfoil core tube to form one or more braided layers. The airfoil core tube and the one or more braided layers forms, at least in part, an airfoil preform. The airfoil preform is then densified with a ceramic matrix material to thereby form a ceramic matrix composite airfoil.

In a further embodiment of any of the foregoing embodiments, the rigidized ceramic fabric includes one or more tube braid layers.

In a further embodiment of any of the foregoing embodiments, initially. before the densifying of the airfoil preform, the rigidized ceramic fabric is partially densified.

In a further embodiment of any of the foregoing embodiments, initially, before the densifying of the airfoil preform, the rigidized ceramic fabric is fully densified.

In a further embodiment of any of the foregoing embodiments, prior to the braiding, the airfoil core tube is combined with an extension piece to form the mandrel.

In a further embodiment of any of the foregoing embodiments, the airfoil core tube is attached with the extension piece in an overlap joint.

In a further embodiment of any of the foregoing embodiments, the airfoil core tube includes tube segments that are arranged end-to-end.

In a further embodiment of any of the foregoing embodiments, the airfoil core tube has a radially-extending, axially open side.

In a further embodiment of any of the foregoing embodiments, prior to the braiding, the airfoil core tube is combined with an extension piece to form the mandrel by connecting the axially open side onto the extension piece.

A further embodiment of any of the foregoing embodiments includes, prior to the braiding, wrapping the mandrel with one or more ceramic fabric layers, followed by the braiding of the plurality of ceramic fiber tows to form the one or more braided layers on the one or more ceramic fabric layers.

A ceramic matrix composite airfoil according to an example of the present disclosure includes an airfoil section that has a prefabricated airfoil core tube made from a ceramic fabric, and one or more braided layers of ceramic fiber tows braided around the prefabricated airfoil core tube. The ceramic fabric and the braided layers are disposed in a ceramic matrix material.

In a further embodiment of any of the foregoing embodiments, the one or more braided layers of ceramic fiber tows extend beyond a terminal edge of the prefabricated airfoil core tube such that the terminal edge and the one or more braided layers of ceramic fiber tows form a step.

In a further embodiment of any of the foregoing embodiments, the prefabricated airfoil core tube includes tube segments that are arranged end-to-end.

In a further embodiment of any of the foregoing embodiments, the airfoil section defines a trailing edge and the prefabricated airfoil core tube is in the trailing edge.

In a further embodiment of any of the foregoing embodiments, the prefabricated airfoil core tube has a radially-extending, axially open side.

In a further embodiment of any of the foregoing embodiments, the one or more braided layers of ceramic fiber tows extend beyond a terminal edge of the radially-extending, axially open side such that the terminal edge and the one or more braided layers of ceramic fiber tows form a step.

A further embodiment of any of the foregoing embodiments includes, one or more ceramic fabric layers between the prefabricated airfoil core tube and the one or more braided layers of ceramic fiber tows.

In a further embodiment of any of the foregoing embodiments, the prefabricated airfoil core tube has a twist.

In a further embodiment of any of the foregoing embodiments, the prefabricated airfoil core tube is bowed.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
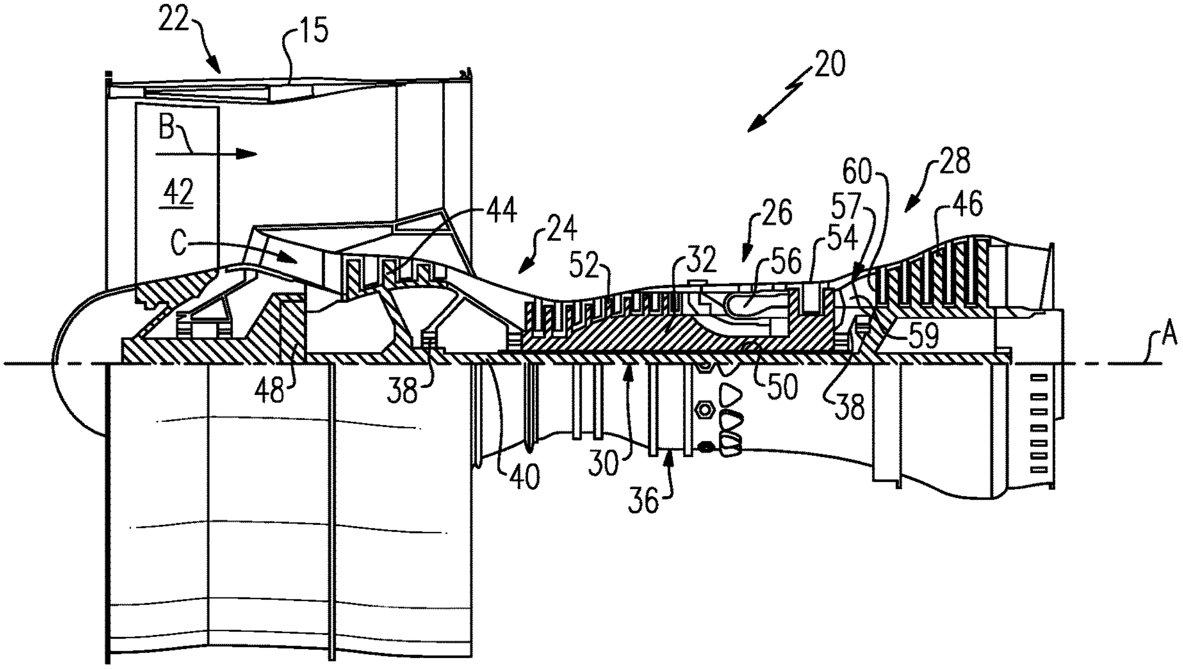
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram}^\circ\ R)/(518.7^\circ\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
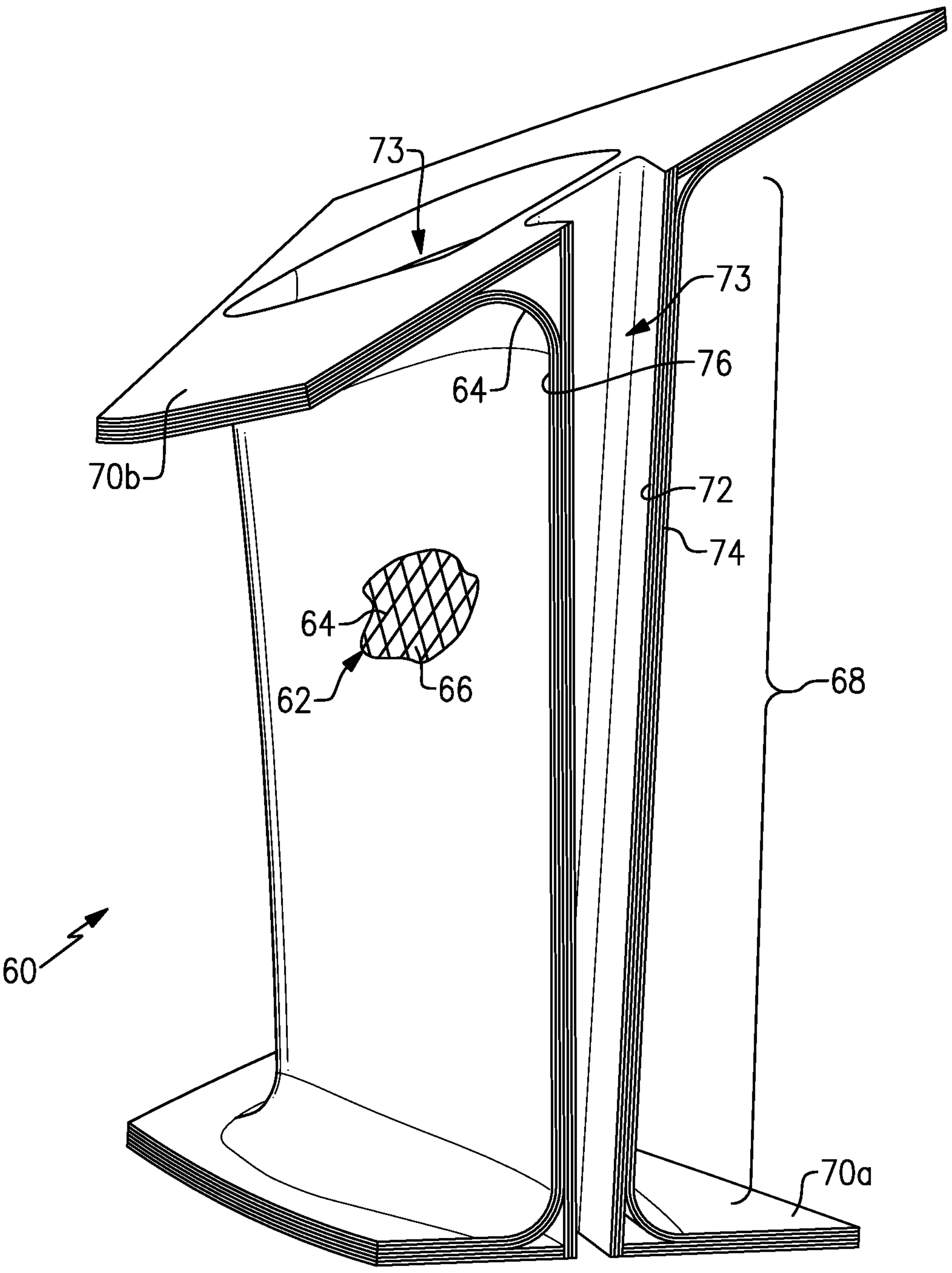
FIG. 2 illustrates a sectioned view of an airfoil from the engine.

FIG. 2 illustrates a sectioned view of a representative example of an airfoil 60 from the turbine section 28. In this example, the airfoil 60 is a vane that is to be supported between inner and outer support hardware, and there are multiple vanes arranged in a circumferential row in the engine 20. It is to be understood that although the examples herein may be discussed in context of a vane from the turbine section 28, the examples can be applied to turbine blades or other types of airfoils in other portions of the engine 20.

The airfoil 60 is formed of a ceramic matrix composite (CMC) 62 (shown in cutaway view). In general, the CMC 62 is a multi-layer structure of ceramic fabric 64 that is disposed in a ceramic matrix 66. As an example, the CMC 62 may be, but is not limited to, a SiC/SiC composite in which SiC fabric is disposed within a SiC matrix. The ceramic fabric 64 has a fiber tow configuration, which refers to an ordered arrangement of the tows relative to one another, such as 2D/3D woven/braided, knitted, or non-textile (e.g., unidirectional, short/long strand matted, etc.) structures).

In the illustrated example, the airfoil 60 is comprised of an airfoil section 68 and first and second platforms 70*a*/70*b* between which the airfoil section 68 extends. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The innermost layer or layers of ceramic fabric 64 of the airfoil section 68 make up a prefabricated airfoil core tube 72 that circumscribes an internal airfoil cavity 73. The airfoil 60 may include multiple core tubes 72, to define multiple cavities 73 (two in the illustrated example). On the outside of the core tube 72, the ceramic fabric 64 is provided as one or more braided layers 74, and one or more skin layers 76 are provided around the braided layers 74. The skin layers 76 may be flared out at the radial ends of the airfoil section 68 to form or partially form the platforms 70*a*/70*b*.

Fabrication of a CMC airfoil that has an internal cavity or cavities may include laying-up all of the ceramic fabric layers directly around a mandrel to provide a fiber preform. The preform is then at least partially densified and then the (direct) mandrel is removed by pulling it out from the densified preform. The preform may then be further densified with the ceramic matrix. Some airfoils, however, have relatively complex geometries that are highly optimized for aerodynamic performance. In such geometries, and even in some simple geometries, extraction of a direct mandrel may be challenging or even unfeasible. For instance, airfoils that are bowed or that have a twist or lean may bind on the direct mandrel and thereby prevent removal or lead to damage of the preform or mandrel during removal. Additionally, in some instances, the ceramic fabric can also deform during subsequent processing steps and thereby "pinch" onto the direct mandrel to inhibit removal or lead to thickness and section-to-section camber variations.

To facilitate mitigation of these concerns, fabrication of the airfoil 60 involves providing the core tube 72 as a rigidized fabric piece and then using the rigidized core tube 72 as a surrogate mandrel (at least in part) instead of a direct mandrel for lay-up of one or more additional fabric layers. A "mandrel" is a core support around which fiber tows are intertwined (e.g., braided) to form the additional fabric layers.

Figure 3:
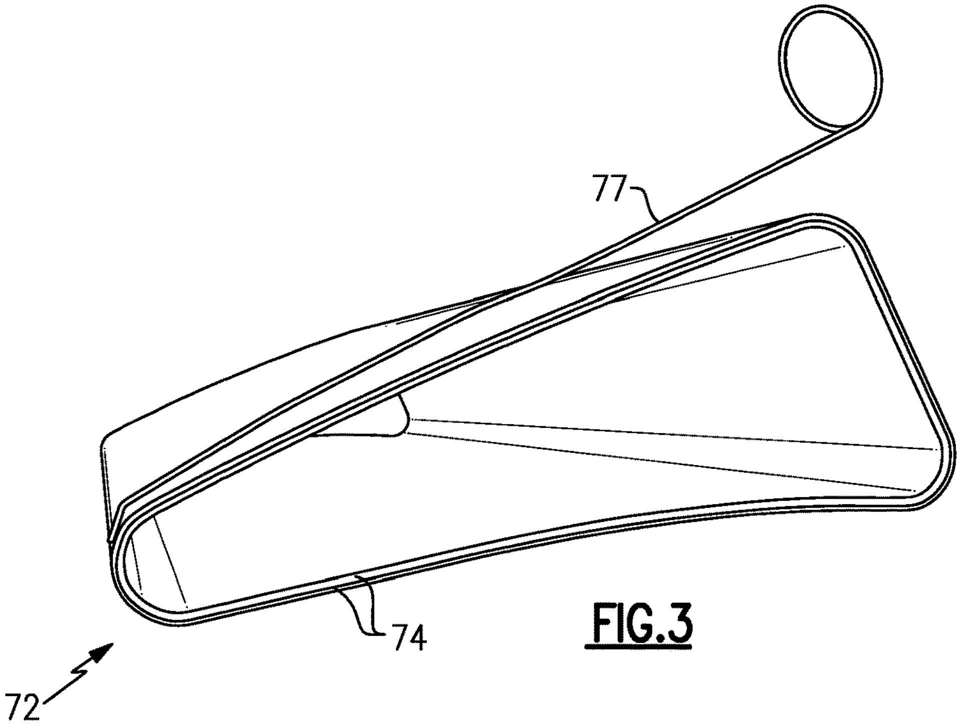
FIG. 3 illustrates a rigidized core tube of the airfoil.

FIG. 3 shows an example of the rigidized core tube 72, which in this case includes two rigidized braided layers 74. The rigidized core tube 72 is prefabricated by laying-up the ceramic fabric to form a fiber preform tube and then densifying or partially densifying the fiber preform tube. Although ceramic fabric is relatively stiff due to the stiffness of the ceramic tows, it is not mechanically strong and stiff enough on its own to serve as a mandrel or hold its shape throughout processing without first being at least partially densified. For example, the fiber preform tube is partially densified in a deposition process to deposit a portion of the ceramic matrix in the fabric. The partial matrix (e.g., SiC) rigidizes the fiber preform tube, thereby providing the rigidized core tube 72 with sufficient stiffness and strength to hold its shape as a mandrel during subsequent processing and lay-up of the braided layers 74. In a further example, the fiber preform tube is fully densified with the interface coating layers and ceramic matrix material. For example, the rigidized core tube 72 can be partially densified from 30% to 60% or fully densified.

As also shown in FIG. 3, the braided layers 74 are then formed on the rigidized core tube 72 by braiding a plurality of ceramic fiber tows 77 around the airfoil core tube 72. Braiding involves the interlacing of three of more tows with each other in a diagonally overlapping pattern, The airfoil core tube 72 and the one or more braided layers 74 form an airfoil preform. The airfoil preform is then interface coated and densified with the ceramic matrix material 66 to thereby form at least a portion of the airfoil 60. As will be appreciated, prior to densification, the skin layers 76 and other layers of ceramic fabric 64 may be laid-up with the airfoil preform to form the platforms 70*a*/70*b* and aerodynamic contours of the final or near final airfoil 60. The densification process may include, but is not limited to, chemical vapor infiltration (CVI), melt infiltration (MI), and/or polymer infiltration and pyrolysis (PIP).

In this case, the airfoil section 68 of the resulting airfoil 60 has a twist (i.e., the angle of the chord of the airfoil section 68 changes across the radial span from the radially inner end to the radially outer end of the airfoil section 68). A direct mandrel with such a twist may be likely to bind and to prevent extraction without breaking. Thus, the use of the rigidized core tube 72 to in essence replace a direct mandrel avoids such an issue and may enable more optimal airfoil geometries that require fewer performance compromises for manufacturability.

Figure 4A:
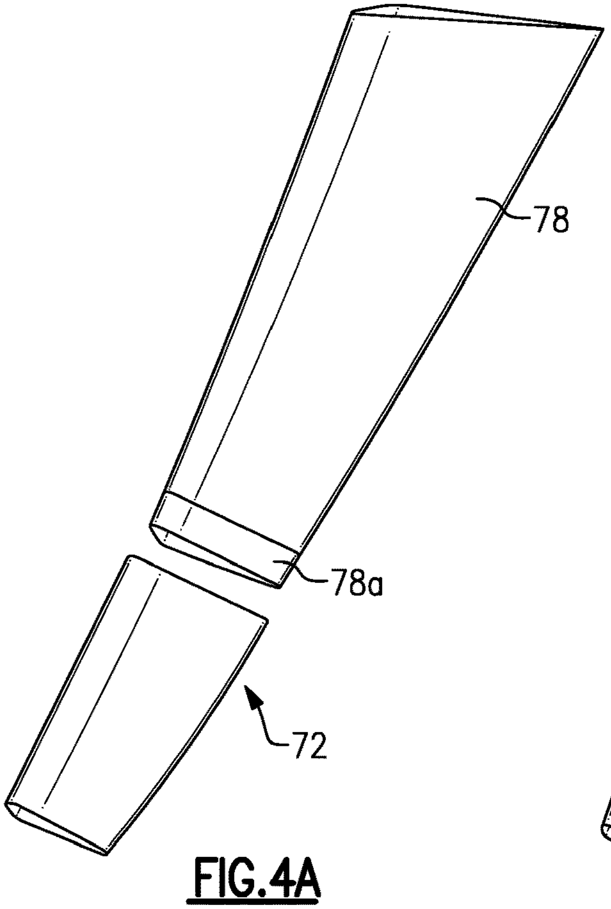
FIG. 4A illustrates a rigidized core tube an extension piece.
Figure 4B:
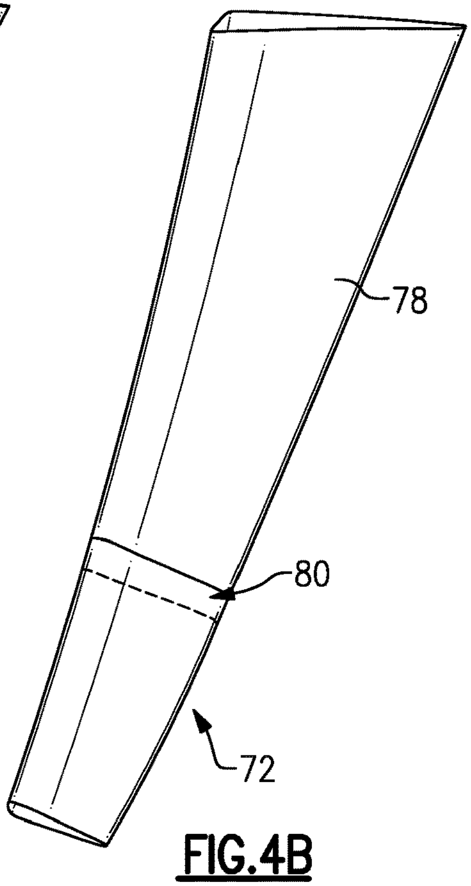
FIG. 4B illustrates the rigidized core tube connected to the extension piece.
Figure 4C:
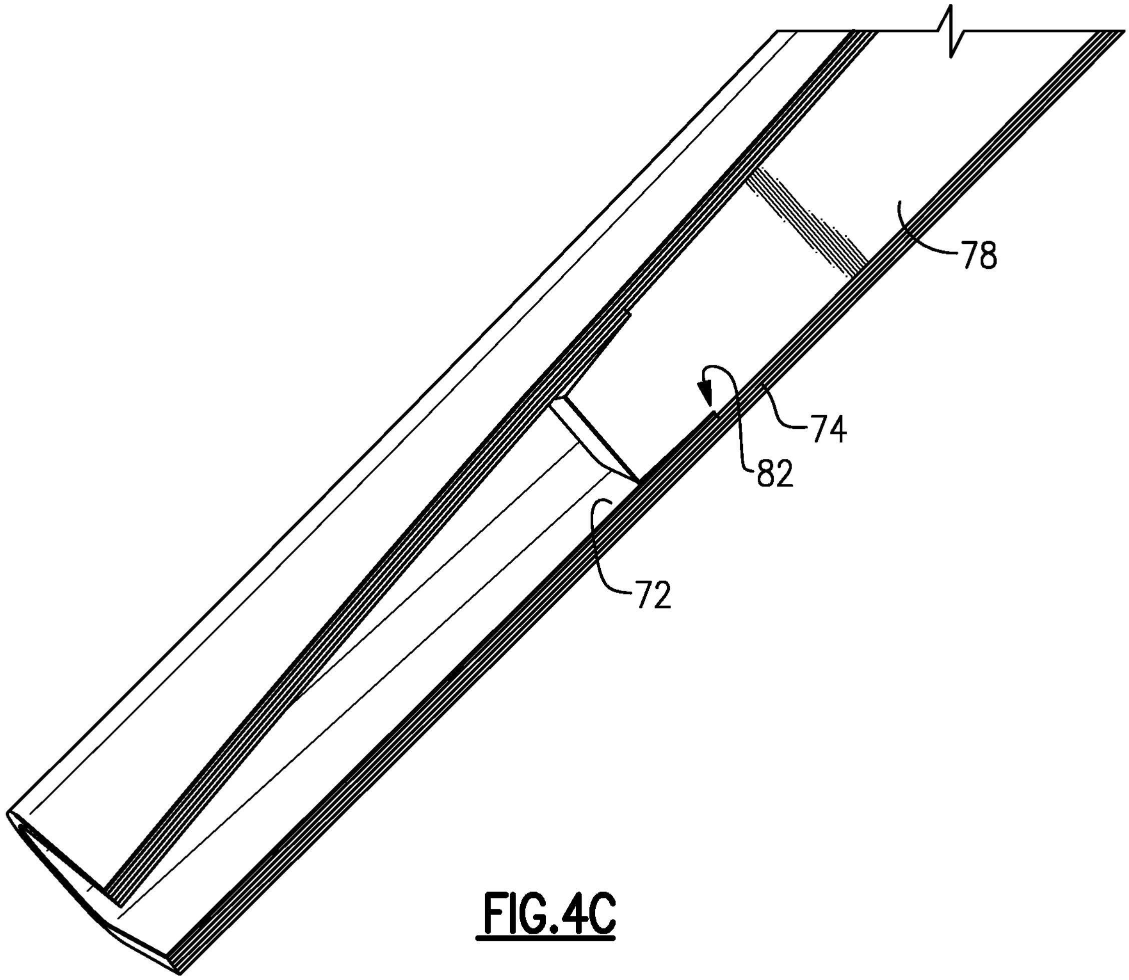
FIG. 4C illustrates the rigidized core tube, extension piece, and braided layers before extraction of the extension piece.

In a further example shown in FIG. 4A, the rigidized core tube 72 is relatively shorter in the radial direction than in the example of FIG. 3. In this case, prior to the braiding to form the braided layers 74, the rigidized airfoil core tube 72 is combined with an extension piece 78 to form the surrogate mandrel. For example, the extension piece 78 is a solid body that is formed of graphite or other material suitable for use as a mandrel. The extension piece 78 includes a connector portion 78*a* over which the rigidized airfoil core tube 72 slides to connect the two pieces together in an overlap joint 80, as shown in FIG. 4B. The rigidized airfoil core tube 72 and the extension piece 78 together form the surrogate mandrel around which one or more braided layers 74 are formed, as described above. Such a configuration may be used for airfoils that have a relatively long radial span, where removal of a full-length mandrel may be difficult. For instance, by in essence replacing the end portion of the full-length mandrel with the rigidized airfoil core tube 72, only a shorter length extension piece 78 needs to be extracted (in comparison to the length of a full size mandrel). The rigidized airfoil core tube 72 remains, as shown in FIG. 4C. In this regard, the braided layers 74 extend beyond a terminal edge of the prefabricated airfoil core tube 72 such that the terminal edge and the braided layers 74 form a step 82 as a vestige of this fabrication process.

Figure 5:
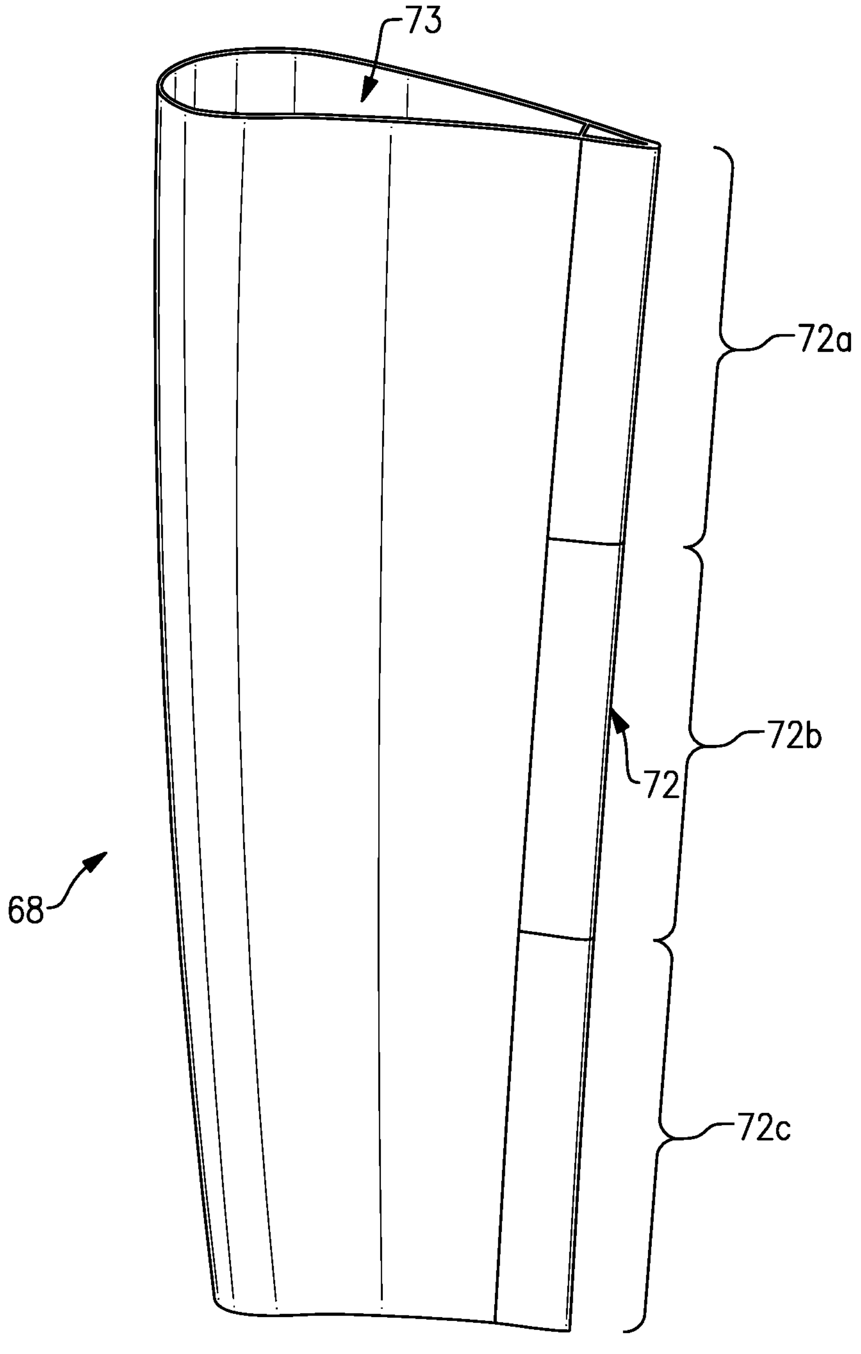
FIG. 5 illustrates a rigidized core tube that has segments arranged end-to-end.

In another example illustrated in FIG. 5, the rigidized airfoil core tube 72 includes tube segments 72*a*/72*b*/72*c* that are arranged (radially) end-to-end. In this example, the rigidized airfoil core tube 72 forms a trailing edge cavity of the airfoil section 68. The trailing edge cavity is smaller than a core cavity 73 of the airfoil 60. If a graphite direct mandrel were to be used, the mandrel would be relatively small and fragile, and thus difficult to extract without breaking. Use of a small and fragile direct mandrel can be avoided by instead segmenting the mandrel into the tube segments 72*a*/72*b*/72*c* which are smaller and make the mandrel easier to extract.

Figure 6:
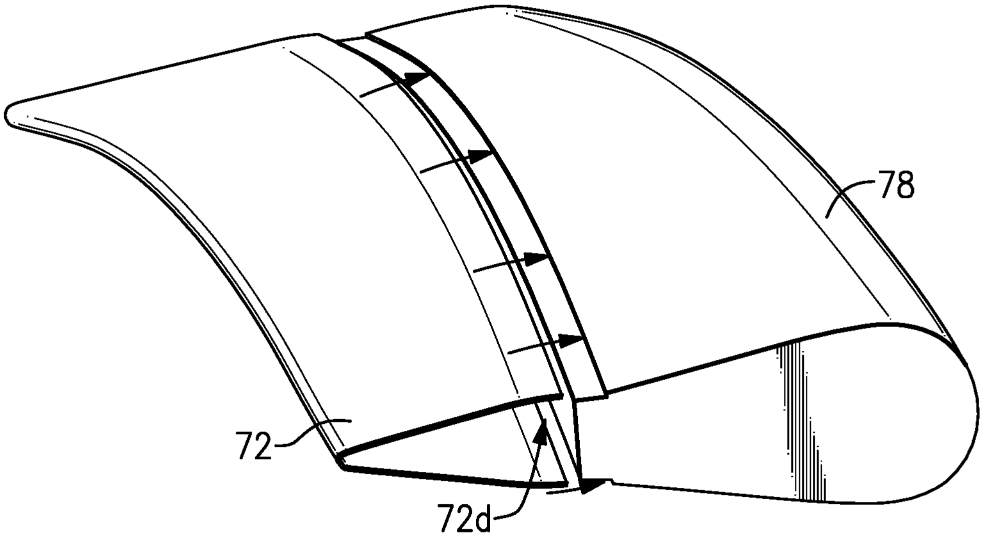
FIG. 6 illustrates a rigidized airfoil core tube that has a radially-extending, axially open side for connection to an extension piece.
Figure 7:
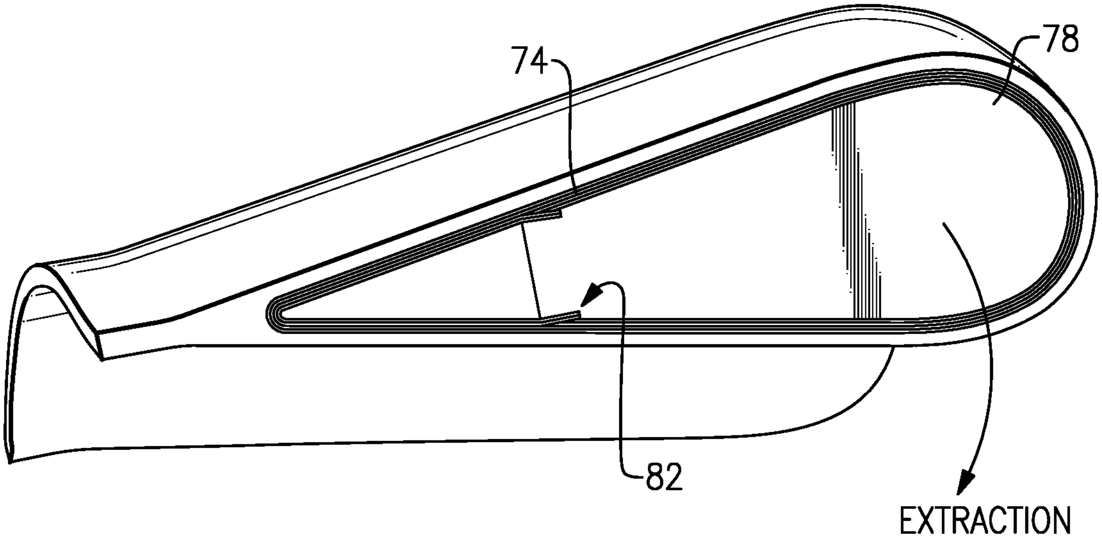
FIG. 7 illustrates the rigidized airfoil core tube from FIG. 6 with overlying braided layers.

In another example shown in FIG. 6, the airfoil core tube 72 has a radially-extending, axially open side 72*d* (relative to the orientation of the airfoil 60 to the axis A in the engine 20). Prior to the braiding to form the braid layers 74, the airfoil core tube 72 is combined with an extension piece 78 to form a surrogate mandrel by connecting the open side 72*d* onto the extension piece 78. Together, the airfoil core tube 72 and extension piece form the full aerodynamic peripheral shape of the airfoil section 68. As shown in FIG. 7, the braided layers 74 are then formed around the surrogate mandrel, followed by lay-up of any other layers of ceramic fabric 64, removal of the extension piece 78, and then densification as discussed above. In this example, the resulting airfoil 60 is bowed, and the extraction direction may thus be along a radial arc. Optionally, prior to the braiding, the surrogate mandrel may be wrapped with one or more ceramic fabric layers, followed by the braiding to form the braided layers 74. Similar to above, a step 82 may be formed between the edge of the prefabricated airfoil core tube 72 and the braided layers 74 (or wrapped ceramic fabric layers).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for fabricating an airfoil, the method comprising:

providing an airfoil core tube that has a cavity and that is made of a fabric that is at least partially densified with a ceramic matrix to provide a rigidized ceramic fabric;

using the airfoil core tube as a surrogate mandrel, without a direct mandrel in the cavity, by braiding a plurality of ceramic fiber tows around the airfoil core tube to form one or more braided layers, the airfoil core tube and the one or more braided layers forming, at least in part, an airfoil preform; and densifying the airfoil preform with a ceramic matrix material to thereby form a ceramic matrix composite airfoil.

2. The method as recited in claim 1, wherein the rigidized ceramic fabric includes one or more tube braid layers.

3. The method as recited in claim 2, wherein initially, before the densifying of the airfoil preform, the rigidized ceramic fabric is fully densified.

4. The method as recited in claim 1, wherein, prior to the braiding, the airfoil core tube is combined with an extension piece to form the mandrel.

5. The method as recited in claim 4, wherein the airfoil core tube is attached with the extension piece in an overlap joint.

6. The method as recited in claim 1, wherein the airfoil core tube includes tube segments that are arranged end-to-end.

7. The method as recited in claim 1, wherein the airfoil core tube has a radially-extending, axially open side.

8. The method as recited in claim 7, wherein, prior to the braiding, the airfoil core tube is combined with an extension piece to form the mandrel by connecting the axially open side onto the extension piece.

9. The method as recited in claim 8, further including, prior to the braiding, wrapping the mandrel with one or more ceramic fabric layers, followed by the braiding of the plurality of ceramic fiber tows to form the one or more braided layers on the one or more ceramic fabric layers.

* * * * *